United States Patent
Kurian et al.

(12)
(10) Patent No.: US 6,245,844 B1
(45) Date of Patent: Jun. 12, 2001

(54) NUCLEATING AGENT FOR POLYESTERS

(75) Inventors: Joseph Varapadavil Kurian; Yuan Feng Liang, both of Newark, DE (US)

(73) Assignee: E. I. du Pont de Nemours and Company, Wilmington, DE (US)

(*) Notice: Subject to any disclaimer, the term of this patent is extended or adjusted under 35 U.S.C. 154(b) by 0 days.

(21) Appl. No.: 09/273,288

(22) Filed: Mar. 19, 1999

Related U.S. Application Data

(60) Provisional application No. 60/100,847, filed on Sep. 19, 1998.

(51) Int. Cl.$^7$ ............................... C08K 5/04; C08K 5/09
(52) U.S. Cl. ............................................................ 524/396
(58) Field of Search .................................................. 524/396

(56) References Cited

U.S. PATENT DOCUMENTS

| | | | |
|---|---|---|---|
| 3,761,450 | 9/1973 | Herwig et al. | 260/75 |
| 4,380,621 | 4/1983 | Nield et al. | 528/287 |
| 5,264,477 | 11/1993 | Wissbrun et al. | 524/396 |
| 5,356,972 | 10/1994 | Sperling et al. | 524/313 |

FOREIGN PATENT DOCUMENTS

| | | |
|---|---|---|
| 2014770 | 10/1970 | (DE). |
| WO 00 17265 | 3/2000 | (WO). |

*Primary Examiner*—Kriellion Sanders

(57) ABSTRACT

Disclosed are polyester polymer compositions containing sodium additives as nucleating agents. More specifically disclosed is the use of mono-sodium salts of dicarboxylic acids as nucleating agents.

28 Claims, 4 Drawing Sheets

NUCLEATING AGENT FOR POLYESTERS

This application claims priority benefit of Provisional Application No. 60/100,847 filed Sep. 19, 1998.

FIELD OF THE INVENTION

This invention concerns polyester polymer compositions containing nucleating agents and a process for making such compositions. More specifically, it concerns the use of mono-sodium dicarboxylates, or precursors thereof, as nucleating agents.

TECHNICAL BACKGROUND OF THE INVENTION

Alkali metal or alkaline earth metal salts of polycarboxylic acids have been used in polyester polymers to increase the crystallinity or the rate of crystallization.

U.S. Pat. No. 3,761,450 describes molding compositions based on linear saturated polyesters comprising small amounts of lithium and/or sodium salts of polycarboxylic acids to bring about a high crystallinity in the heated mold after a short time. Polyesters and salts of polycarboxylic acids are disclosed generally. Poly(ethylene terephthalate) and disodium 1,10-dodecanedicarboxylate are exemplified.

U.S. Pat. No. 5,264,477 discloses an improved melt processable liquid crystalline polyester composition capable of forming an anisotropic melt phase and having an improved heat distortion temperature under a load by using 0.05 to 1.0 weight percent of a divalent metal salt of an aromatic dicarboxylic acid, wherein the metal is zinc, calcium, cadmium, barium or mixtures thereof.

U.S. Pat. No. 4,380,621 discloses fast crystallizing polyesters in which at least some of the acid end groups of the polyester have the formula —COO$^-$ M$^+$ where M$^+$ is an alkaline metal ion. Poly(ethylene terephthalate) and poly(butylene terephthalate) are specifically disclosed. Poly(ethylene terephthalate) is exemplified. Sodium containing species exemplified include sodium hydroxide, sodium benzoate and sodium o-chlorobenzoate.

SUMMARY OF THE INVENTION

This invention concerns a polyester composition comprising a mono-sodium salt of a dicarboxylic acid selected from the group consisting of monosodium terephthalate, mono sodium naphthalene dicarboxylate and mono sodium isophthalate as a nucleating agent. The invention also concerns a process for making a polyester composition useful as a nucleating agent.

In a preferred embodiment, the polyester is selected from the group consisting of poly(trimethylene naphthalate), poly(trimethylene isophthalate) and poly(trimethylene terephthalate). Most preferred is a composition comprising a poly(trimethylene terephthalate) and mono-sodium terephthalate as a nucleating agent. The monosodium terephthalate may be added to the system or may be generated in situ by the addition of an appropriate sodium containing species to a polymerization reaction mixture comprising terephthalic acid.

An especially desirable embodiment comprises poly(trimethylene terephthalate) and 0.005 to 2 wt % mono-sodium terephthalate.

DETAILED DESCRIPTION OF THE INVENTION

Figure 1:
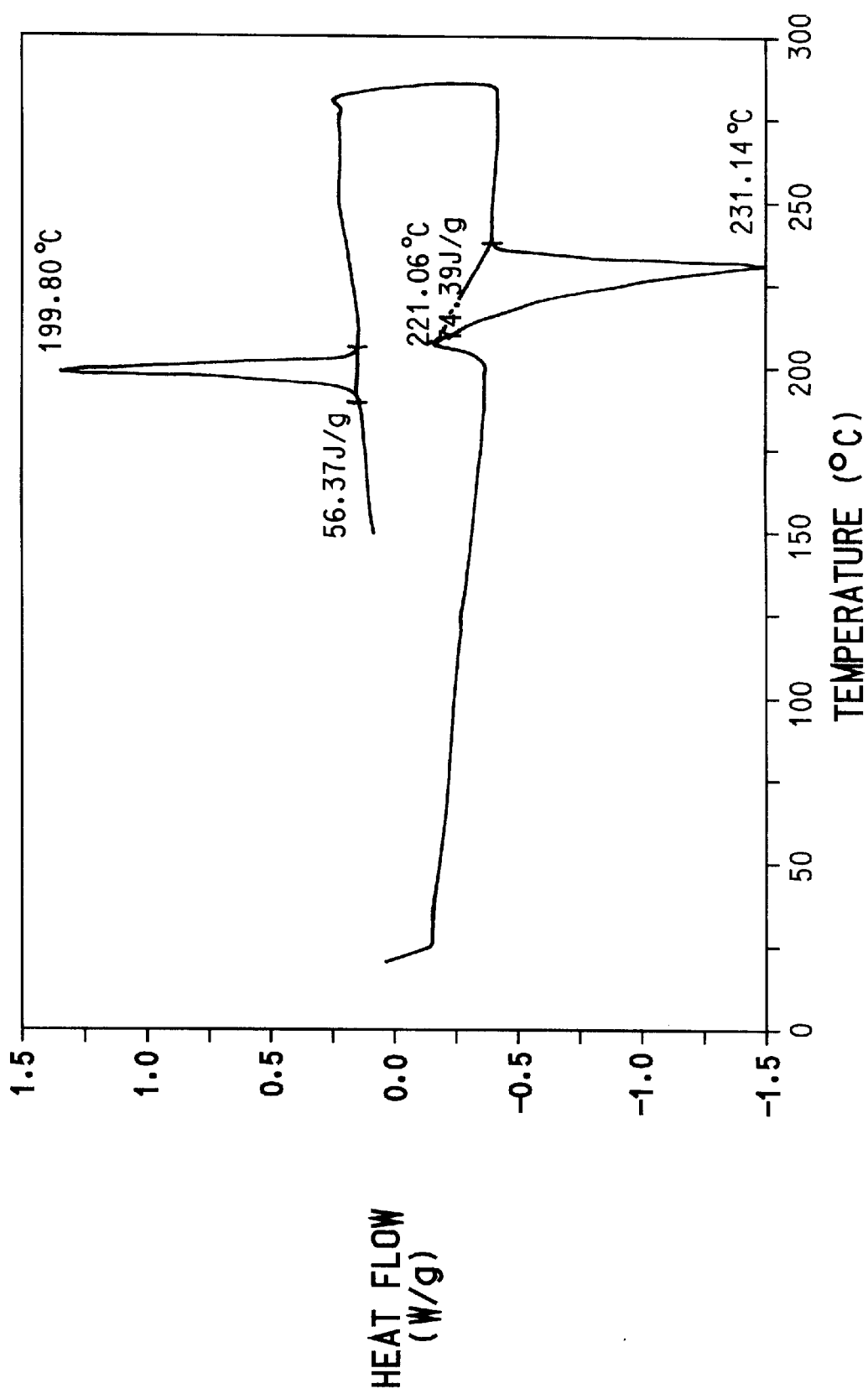
FIG. 1 is a Differential Scanning Calorimeter plot (heat flow vs temperature) for poly(trimethylene terephthalate) containing mono-sodium terephthalate as in Example 1.
Figure 2:
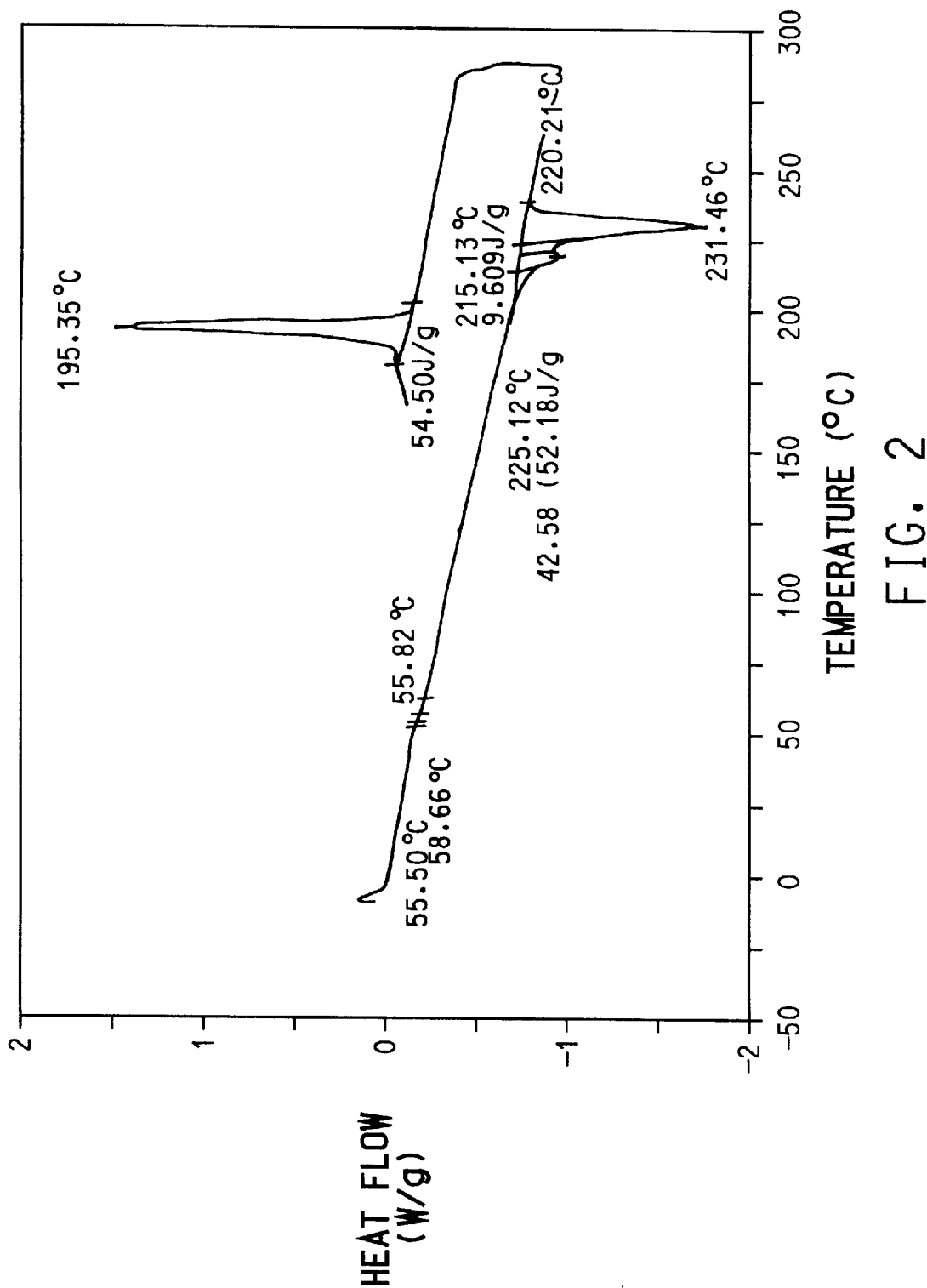
FIG. 2 is a Differential Scanning Calorimeter plot (heat flow vs temperature) for poly(trimethylene terephthalate) containing mono-sodium terephthalate as in Example 2.
Figure 3:
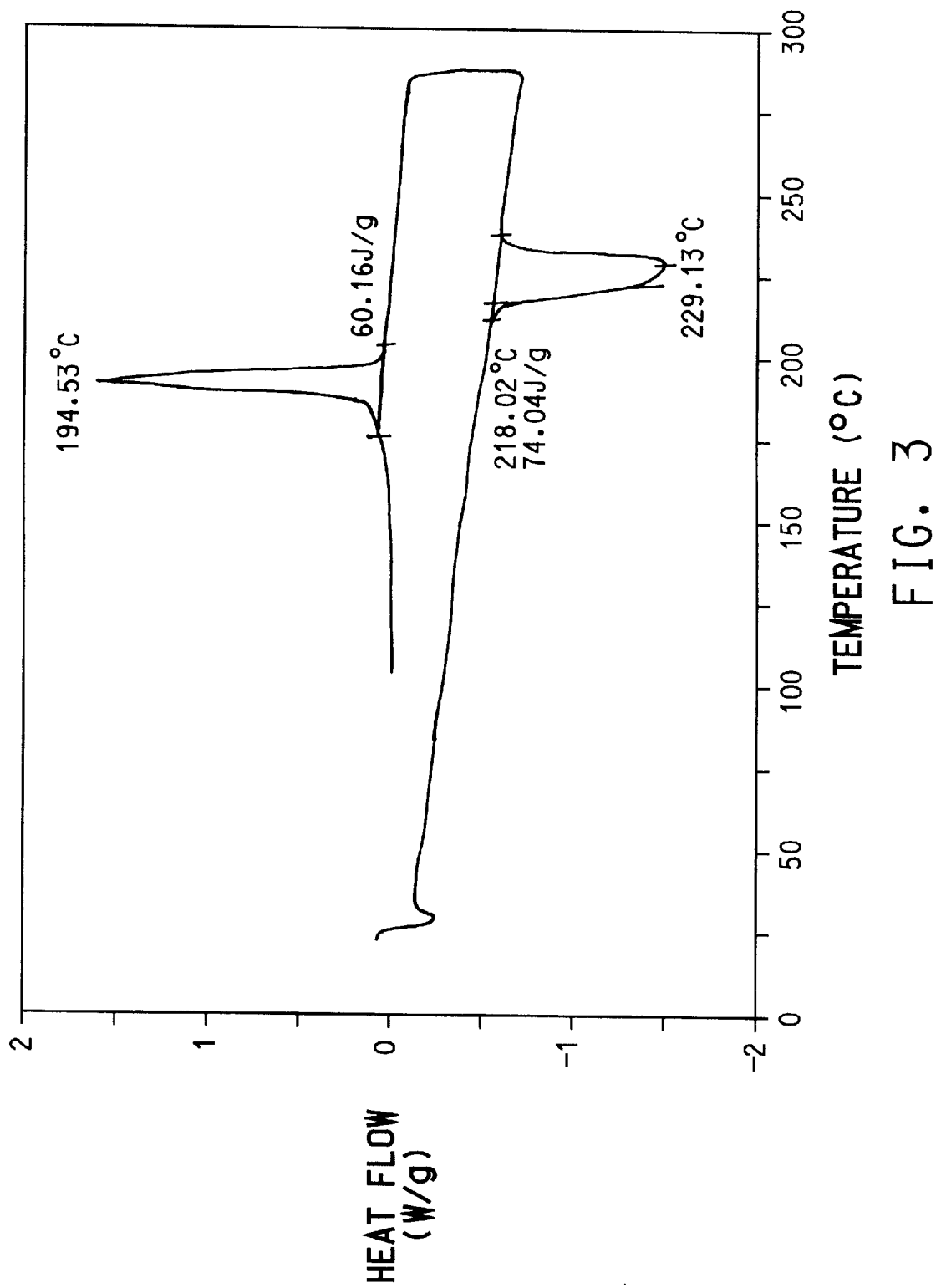
FIG. 3 is a Differential Scanning Calorimeter plot (heat flow vs temperature) for poly(trimethylene terephthalate) containing mono-sodium terephthalate as in Example 3.
Figure 4:
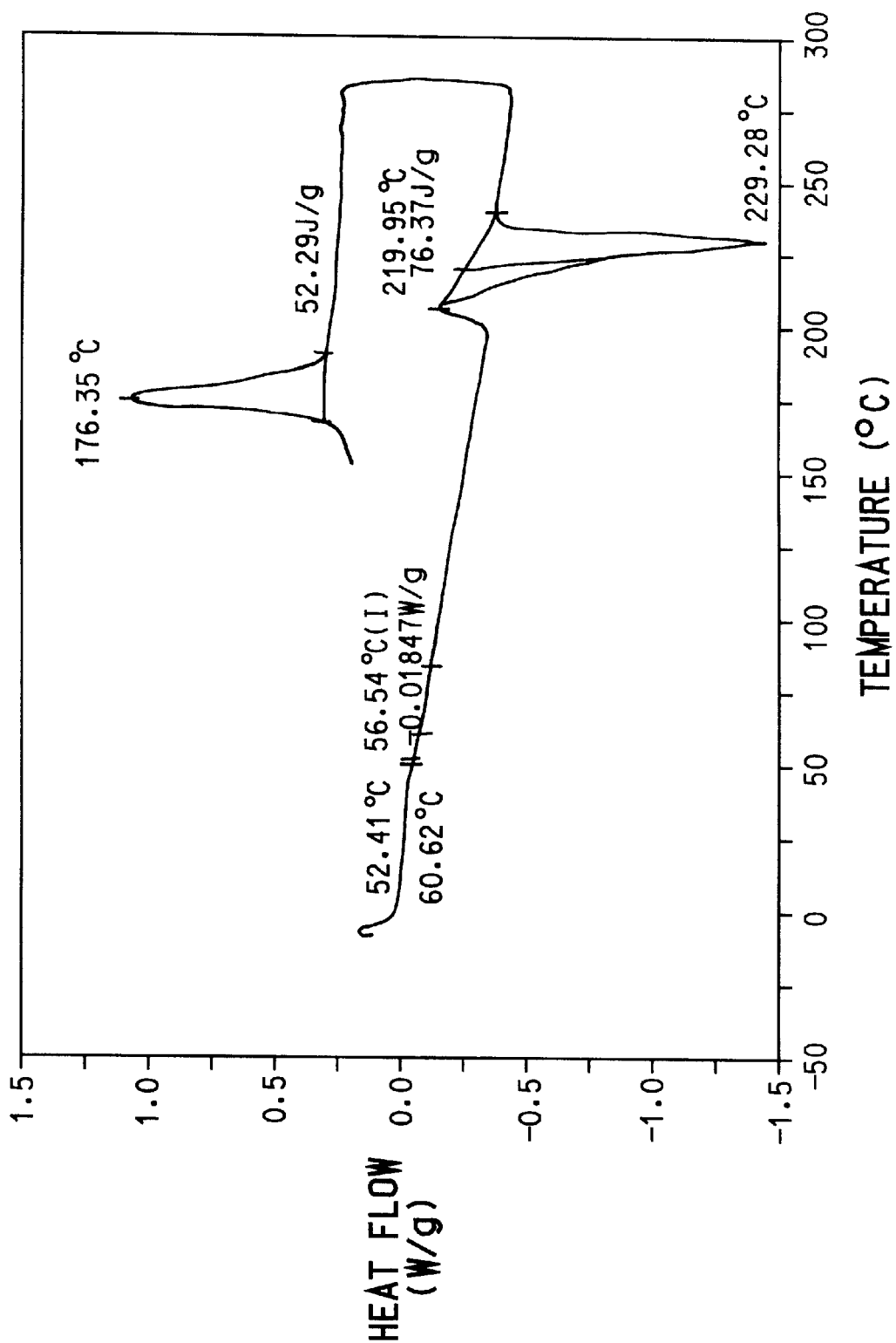
FIG. 4 is a Differential Scanning Calorimeter plot (heat flow vs temperature) for the control poly(trimethylene terephthalate) of Comparative Example 1.

Methods for increasing the crystallization rate and increasing the crystallinity of polyester polymers by adding various alkali metal or alkaline earth metal salts are known in the art. However, many of the disclosed salts show little nucleating effect, if any. Therefore, it is an object of this invention to provide highly efficient nucleating species for polyesters. Mono-sodium terephthalate is a most efficient nucleating agent for polyesters.

Polyesters containing mono-sodium terephthalate exhibit short crystallization half times and early onsets of crystallization as measured by differential scanning calorimeter (DSC) in the heating and cooling cycle. The presence of mono-sodium terephthalate dramatically lowers the crystallization half time of a polyester polymer and speeds up the onset of the crystallization time (as well as the early appearance of the crystallization peak temperature) during the cooling phase of the polymer, all as measured by DSC analysis.

These are desirable effects because such polymers can quickly become rigid, leading to faster demold times and shorter cycle times in processing the polymers into shaped articles by such methods as thermoforming, injection molding, and blow molding.

A further result achieved by the practice of this invention is the improvement of physical properties of polyester polymers by increasing the crystallization rate and increasing the crystallinity.

When the composition of this invention is compared to the same polyester polymer having no nucleating agent, the polyester polymer containing mono-sodium terephthalate exhibited a dramatically lower crystallization half time and earlier onset of the crystallization time (early arrival of the crystallization peak temperature) during the cooling phase. It has also been found that poly (trimethylene terephthalate) polyester containing mono-sodium terephthalate exhibited significant improvement in brittleness, heat resistance, and impact resistance.

The polymer of the invention contains preferably about 80% or more of poly(trimethylene terephthalate), poly(trimethylene isophthalate or poly(trimethylene naphthalate) in mole percentage. These may be modified with up to 20 mol percent of polyesters made from other diols or diacids. The most preferred polymer is poly(trimethylene terephthalate). Also preferred are blends and copolymers of poly(trimethylene terephthalate).

Other diacids, referred to above, include isophthalic acid, 1,4-cyclohexane dicarboxylic acid, 1,3-cyclohexane dicarboxylic acid, succinic acid, glutaric acid, adipic acid, sebacic acid, 1,12-dodecane dioic acid, and the derivatives thereof such as the dimethyl, diethyl, or dipropyl esters of these dicarboxylic acids.

Other diols, referred to above, include ethylene glycol, 1,4-butane diol, 1,2-propanediol, diethylene glycol, triethylene glycol, 1,3-butane diol, 1,5-pentane diol, 1,6-hexane diol, 1,2-, 1,3- and 1,4-cyclohexane dimethanol, and the longer chain diols and polyols made by the reaction product of diols or polyols with alkylene oxides.

Mono-sodium terephthalate may be admixed with the polyester in various ways in an amount of from 0.005 to 2 wt %, preferably from 0.008 to 0.8 wt % (which corresponds to 10 ppm to 1000 ppm calculated as sodium) in polymer. It can be added at any time during the synthesis of polyester, which in general is carried out by the esterification/transesterification followed by polycondensation process. It is also possible to mix mono-sodium terephthalate with granular polyester followed by processing in an extruder. The mono-sodium terephthalate may be added as a pure compound or as a masterbatch, in the same or different polyester to which it is being added. Mono-sodium terephthalate can be prepared from disodium terephthalate and phthalic anhydride according to the method described in GB-975355.

Mono sodium terephthalate, mono sodium isophthalate or mono sodium naphthalene dicarboxylate may also be generated in situ by the addition of an appropriate sodium containing species to a polymerization reaction mixture comprising terephthalic acid, isophthalic acid or naphthalene dicarboxylic acid. By appropriate sodium containing species is meant a sodium compound capable of reacting with terephthalic acid or naphthalene dicarboxylic acid to generate a mono sodium salt. Suitable sodium containing species include, for example, sodium hydroxide, sodium acetate, sodium carbonate, and trisodium phosphate.

EXAMPLES

Example 1

Preparation of poly(trimethylene terephthalate) from dimethyl terephthalate (DMT) and 1,3-propanediol with mono-sodium terephthalate.

A 250 ml flask equipped with a stirrer and distillation column was charged with 58.5 g of dimethyl terephthalate (E. I. du Pont de Nemours and Company, Wilmington, Del.) and 41 g of 1,3-propanediol (Degussa A G, Wolfgang, Germany) for a mol ratio of 1,3-propanediol:DMT of 1.8:1. The flask was then purged with nitrogen and the contents of the flask were heated. When the temperature inside the flask reached about 150° C. and all of the dimethyl terephthalate had melted, the stirrer was started. When the temperature reached 210° C., 18.4 mg of Tyzor® TPT (DuPont, Wilmington, Del.) was added as a catalyst. The temperature was held at 210° C. for approximately 80 minutes and the methanol generated was removed as a liquid condensate by distillation.

After evolution of methanol had ceased, indicating complete conversion of dimethylterephthalate to bis(3-hydroxypropyl)terephthalate, 0.15 g of mono-sodium terephthalate was added (calculated to give 0.245 wt % in final polymer) and the bis(3-hydroxypropyl)terephthalate was polymerized in the same vessel at a temperature of 250° C. and pressure of 0.3 mmHg, without additional catalyst. The poly(trimethylene terephthalate) resin obtained had an intrinsic viscosity of 0.75 dl/g, melting point of 231° C., and crystallization point of 199.8° C. (measured as the peak from the cooling cycle in DSC trace).

Example 2

Preparation of poly(trimethylene terephthalate) from terephthalic acid (TPA) and 1,3-propanediol with mono-sodium terephthalate.

A 250 ml flask equipped with a stirrer and distillation column was charged with 66.1 g of terephthalic acid (TPA), 49 g of 1,3-propanediol for a mole ratio of 1,3-propanediol:DMT of 1.8:1, and 17 mg of butylstannoic acid (Witco Corporation, Allentown, Pa.). The flask was then purged with nitrogen and the stirrer was started. The contents of the flask were heated to 210° C. and held for 4.5 hours until a clear solution was obtained. Water generated during the esterification reaction was removed as a liquid condensate by distillation.

After a clear solution was reached, 0.2 g of mono-sodium terephthalate (calculated to give 0.245 wt % in fmal polymer) and 24.3 mg of Tyzor® TPT were added. The resulting monomer, bis(3-hydroxypropyl)terephthalate, was polymerized in the same vessel at a temperature of 250° C. and pressure of 0.5 mmHg. The poly(trimethylene terephthalate) resin obtained had an intrinsic viscosity of 0.87 dl/g, melting point of 231 ° C., and crystallization point of 195.4° C. (measured as the peak from the cooling cycle in DSC trace).

Example 3

Preparation of poly(trimethylene terephthalate) from dimethyl terephthalate (DMT) and 1,3-propanediol with mono-sodium terephthalate.

A 25 gallon autoclave was charged with 125 lbs. of dimethyl terephthalate (DMT), 68 lbs. of 1,3-propanediol for a mole ratio of 1,3-propanediol:DMT of 1.4:1 and 18.2 g Tyzor® TPT. The temperature was raised to 210° C. and held for 2.5 hours. Methanol generated was removed as a liquid condensate by distillation.

After evolution of methanol had ceased, the resulting monomer, bis(3-hydroxypropyl) terephthalate, was transferred to a different clave and polymerized along with 250 g of mono-sodium terephthalate (calculated to give 0.41 wt % in final polymer) at a temperature of 250° C. and a pressure of 0.6 for 3.5 hours. The obtained poly(trimethylene terephthalate) resin was pelletized and solid phased (2 hours at 180° C. and for 7 hours at 205° C. The intrinsic viscosity of the final polymer was 1.1 dl/g, melting point of 230° C. and crystallization point of 194.5° C. (measured as the peak from the cooling cycle in DSC trace).

Comparative Example 1

Preparation of poly(trimethylene terephthalate) from dimethyl terephthalate (DMT) and 1,3-propanediol without mono-sodium terephthalate.

A 250 ml flask equipped with a stirrer and distillation column was charged with 58.5 g of dimethyl terephthalate (DMT) and 41 g of 1,3-propanediol for a mole ratio of 1,3-propanediol:DMT of 1.8:1. The flask was then purged with nitrogen and the contents of the flask were heated. When the temperature inside the flask reached about 150° C. and all of the DMT had melted, the stirrer was started. When the temperature reached 210° C., (18.4 mg Tyzor® TPT was added. The temperature was held at 210° C. for approximately 90 minutes and the methanol generated was removed as a liquid condensate by distillation.

After evolution of methanol had ceased, the resulting monomer, bis(3-hydroxypropyl)terephthalate, was polymerized in the same vessel at a temperature of 250° C. and pressure of 0.5 mm Hg, without additional catalyst. The poly(trimethylene terephthalate) resin obtained had an intrinsic viscosity of 0.76 dl/g, melting point of 229° C. and crystallization point of 176° C. (measured as the peak on the differential scanning calorimeter).

Table 1 compares crystallization temperatures for the polymers of Examples 1–3 and Comparative Example 1.

The data demonstrate that poly(trimethylene terephthalate) containing mono-sodium terephthalate possess significantly higher crystallization temperatures (Tc) than the control polymer. The nucleated polyesters showed enhanced crystallization and reduced crystallization half time during cooling process from molten phase.

TABLE 1

Crystallization Temperature vs Mono-Sodium Terephthalate Levels

|  | Comparative Example A | Example 1 | Example 2 | Example 3 |
|---|---|---|---|---|
| Mono-sodium terephthalate (wt %) | 0 | 0.245 | 0.245 | 0.41 |
| Crystallization Temperature (° C.) | 176 | 200 | 195 | 194 |

Table 2 shows the improvement in heat resistance and impact resistance of nucleated poly(trimethylene terephthalate) polyester (containing 0.41 wt % of mono-sodium terephthalate) as prepared in Example 3 over the material of comparative Example 1. With nucleated 3GT, the discoloration temperature is 40° C. higher, and the impact resistance is 3 times as much as that of the control.

TABLE 2

Heat & Impact Resistance of Poly(trimethylene terephthalate) Containing Mono-Sodium Terephthalate vs Control

|  | Example 3 | Comp. Example 1 |
|---|---|---|
| I.V. | 1.1 | 1.04 |
| Discoloration Temperature (Hot Block, ° C.) | >200 | 160 |
| Max-Impact Energy (J) | 9 | 3.3 |

Example 4

Preparation of Poly(trimethylene terephthalate) containing 0.2 wt % mono-sodium terephthalate.

Poly(trimethylene terephthalate) containing 0.2 wt % mono-sodium terephthalate was prepared as in Example 3 above, except with the lowered amount of mono-sodium terephthalate. Table 3 shows the improvement of Flexmod, Tensile, Elongation and UNI of nucleated poly(trimethylene terephthalate) (containing 0.2 wt % of mono-sodium terephthalate) over poly(trimethylene terephthalate) control in unfilled system. Remarkably, the elongation of nucleated poly(trimethylene terephthalate) is 7 times as much as that of control, which indicates a significant improvement in brittleness. The tensile strength and unnotched impact (UNI) of nucleated poly(trimethylene terephthalate) also dramatically improved.

Table 4 shows the comparison of Flexmod, Tensile, Elongation, and UNI of Example 4 (containing 0.2 wt % of mono-sodium terephthalate) to the control in the system filled with 30% of glass. All these properties have significantly improved for mono-sodium terephthalate nucleated material over the control.

TABLE 3

Physical Properties of poly(trimethylene terephthalate) Containing 0.2% Mono-Sodium Terephthalate vs Control[1]

|  | Example 4 | Comp.Example 1 |
|---|---|---|
| I.V. | 1.1 | 0.85 |
| Flexural modulus (kpsi) | 412 | 389 |
| Tensile Strength (psi) | 10,000 | 6,815 |
| Elongation (%) | 14.2 | 1.99 |
| UNI (ft-lb/in) | 21.44 | 8.96 |

[1]The ASTM methods for the properties in TABLE 3 and 4: flexural modulus, D790; tensile strength, D638; elongation @ break, D638; Unnotched Impact (UNI), D256

TABLE 4

Physical Properties of poly(trimethylene terephthalate) Containing 0.2% Mono-Sodium Terephthalate vs Control (Both Filled with 30% Glass)

|  | Example 4 (filled) | Comp. Example 1 |
|---|---|---|
| I.V. | 1.1 | 0.9 |
| Flexural modulus (kpsi) | 1404 | 1377 |
| Tensile Strength (psi) | 24,660 | 22,480 |
| Elongation (%) | 2.88 | 1.99 |
| UNI (ft-lb/in) | 18.74 | 13.81 |

Example 5

The general procedure of Example 2 was followed to prepare poly(trimethylene terephthalate) containing in-situ prepared monosodium terephthalate by use of various sodium salts as below.

| Sodium Salt | Sodium Concentration (ppm) | Tc(° C.) |
|---|---|---|
| Sodium Hydroxide | 300 | 194 |
| Sodium Acetate | 300 | 188 |
| Sodium Carbonate | 300 | 183 |
| Sodium Phosphate | 320 | 178 |
| Control | 0 | 175 |

Example 6

Poly(trimethylene naphthalate) (11.6 mg) and mono-sodium terephthalate (1.3 mg) were mixed in a DSC cell and heated in a DSC instrument (DuPont 2100) at a rate of 10° C./min to 290° C. The melt was kept isothermal at 290° C. for 10 minutes and cooled down at a rate of 10° C./min to room temperature. A second heat/cool cycle was conducted in the same DSC cell using the same rates. The crystallization temperature (Tc) in the first cooling cycle was 183° C. and increased to 197° C. in the second cycle. Poly (trimethylene naphthalate) without any additive exhibited a crystallization temperature (Tc) in its first cooling cycle of 183° C. and 184° C. in the second cycle.

What is claimed is:

1. A polyester composition comprising a poly (trimethylene dicarboxylate) and a mono-sodium salt of a dicarboxylic acid selected from the group consisting of monosodium terephthalate, mono sodium naphthalene dicarboxylate and mono sodium isophthalate as a nucleating agent.

2. The composition of claim 1 wherein the poly (trimethylene dicarboxylate) is selected from the group consisting of poly(trimethylene naphthalate), poly (trimethylene isophthalate) and poly(trimethylene terephthalate).

3. The composition of claim 1 wherein the mono-sodium salt is present in an amount of from about 0.005 wt % to 2 wt %.

4. The composition of claim 3 wherein the mono-sodium salt is present in an amount of from about 0.008 to 1 wt %.

5. The composition of claim 2 further comprising up to about 20% of polyesters comprising diacids or diols other than the poly(trimethylene naphthalate), poly(trimethylene isophthalate) and poly(trimethylene terephthalate).

6. The composition of claim 1 produced by a process where the monosodium salt of the dicarboxylic acid is generated in situ by the addition of an appropriate sodium containing species to a polymerization reaction mixture comprising a dicarboxylic acid.

7. The composition of claim 6 wherein the sodium containing species is selected from the group consisting of sodium hydroxide, sodium acetate, sodium carbonate, disodium terephthalate, and trisodium phosphate.

8. The composition of claim 1 or claim 6 wherein the poly(trimethylene dicarboxylate) is poly(trimethylene terephthalate) and the crystallization temperature of said poly(trimethylene terephthalate) is at least 178° C.

9. The composition of claim 8 wherein the crystallization temperature is at least 190° C.

10. The composition of claim 1 wherein the poly(trimethylene dicarboxylate) is poly(trimethylene terephthalate) and the mono sodium salt of a dicarboxylic acid is monosodium terephthalate which is added and not generated in situ.

11. The composition of claim 1 wherein the poly(trimethylene dicarboxylate) is poly(trimethylene naphthalate) and the mono sodium salt of a dicarboxylic acid is monosodium terephthalate and/or mono sodium naphthalate which is added and not generated in situ.

12. The composition of claim 1 wherein the poly(trimethylene dicarboxylate) is poly(trimethylene isophthalate) and the mono sodium salt of a dicarboxylic acid is monosodium terephthalate and/or mono sodium isophthalate which is added and not generated in situ.

13. A process for the preparation of a polyester composition containing a poly(trimethylene dicarboxylate) and a nucleating agent comprising contacting a a poly(trimethylene dicarboxylate) with a mono-sodium salt of a dicarboxylic acid selected from the group consisting of monosodium terephthalate, mono sodium naphthalene dicarboxylate and mono sodium isophthalate.

14. A process for the preparation of a polyester composition containing a poly(trimethylene terephthalate) and a nucleating agent comprising contacting dimethyl terephthalate and 1,3-propanediol or contacting terephthalic acid and 1,3-propanediol, under polymerizing conditions with a mono-sodium salt of a dicarboxylic acid selected from the group consisting of monosodium terephthalate, mono sodium naphthalene dicarboxylate and mono sodium isophthalate.

15. The process of claim 13 wherein the poly(trimethylene dicarboxylate) is selected from the group consisting of poly(trimiethylene naphthalate), poly(trimethylene isophthalate) and poly(trimethylene terephthalate).

16. The process of claim 13 or 14 wherein the mono-sodium salt is present in an amount of from about 0.005 wt % to 2 wt %.

17. The process of claim 16 wherein the mono-sodium salt is present in an amount of from about 0.008 to 1 wt %.

18. The process of claim 15 further comprising up to about 20% of polyesters comprising diacids or diols other than the poly(trimethylene naphthalate), poly(trimethylene isophthalate) or poly(trimethylene terephthalate).

19. The process of claim 13 wherein the monosodium salt of the dicarboxylic acid is generated in situ by the addition of an appropriate sodium containing species to a polymerization reaction mixture comprising a dicarboxylic acid.

20. The process of claim 19 wherein the sodium containing species is selected from the group consisting of sodium hydroxide, sodium acetate, sodium carbonate, disodium terephthalate, and trisodium phosphate.

21. The process of claim 13 wherein the polyester is poly(trimethylene terephthalate) and the crystallization temperature of said poly(trimethylene terephthalate) is at least 178° C.

22. The process of claim 13 or claim 14 wherein the polyester is poly(trimethylene terephthalate) and the mono sodium salt of a dicarboxylic acid is monosodium terephthalate which is added and not generated in situ.

23. A poly(trimethylene terephthalate) having a crystallization temperature of at least 178° C.

24. The poly(trimethylene terephthalate) of claim 23 wherein the crystallization temperature is at least 190° C.

25. The poly(trimethylene terephthalate) of claim 23 wherein the crystallization temperature is at least about 194° C.

26. The poly(trimethylene terephthalate) of claim 23 wherein the crystallization temperature of 178 to about 200° C.

27. The composition of claim 1 further comprising up to about 20% of polyesters comprising diacids or diols other than the poly(trimethylene dicarboxylate).

28. The process of claim 13 further comprising up to about 20% of polyesters comprising diacids or diols other than the poly(trimethylene dicarboxylate).

* * * * *

UNITED STATES PATENT AND TRADEMARK OFFICE
CERTIFICATE OF CORRECTION

PATENT NO. : 6,245,844 B1
DATED : June 12, 2001
INVENTOR(S) : Kurian et al.

It is certified that error appears in the above-identified patent and that said Letters Patent is hereby corrected as shown below:

<u>Title page,</u>
Item [60], change "Sep. 19," to -- Sept. 18, --.

<u>Column 7,</u>
Line 42, replace "a a" with -- a --.

<u>Column 8,</u>
Line 6, correct the spelling of word from "poly(trimiethylene naphthalate)" to
-- poly(trimethylene naphthalate --.
Lines 27 and 32, replace "polyester" with -- poly(trimethylene dicarboxylate) --.
Line 43, replace "of" with -- is --.

Signed and Sealed this

Sixteenth Day of July, 2002

*Attest:*

*Attesting Officer*

JAMES E. ROGAN
*Director of the United States Patent and Trademark Office*